US007524909B2

(12) United States Patent
Palmese et al.

(10) Patent No.: US 7,524,909 B2
(45) Date of Patent: Apr. 28, 2009

(54) FATTY ACID MONOMERS TO REDUCE EMISSIONS AND TOUGHEN POLYMERS

(75) Inventors: Giuseppe Raffaello Palmese, Hainesport, NJ (US); John Joseph La Scala, Bel Air, MD (US); James Matthew Sands, Kingsville, MD (US)

(73) Assignees: Drexel University, Philadelphia, PA (US); The United States of America as represented by the Secretary of the Army, Washington, DC (US)

( * ) Notice: Subject to any disclaimer, the term of this patent is extended or adjusted under 35 U.S.C. 154(b) by 497 days.

(21) Appl. No.: 11/124,551

(22) Filed: May 6, 2005

(65) Prior Publication Data

US 2005/0250923 A1    Nov. 10, 2005

Related U.S. Application Data

(60) Provisional application No. 60/569,379, filed on May 7, 2004.

(51) Int. Cl.
*C08F 20/10*  (2006.01)
*C08F 20/68*  (2006.01)
(52) U.S. Cl. .................. 526/318; 526/307.5; 526/317.1; 562/545
(58) Field of Classification Search .................. 562/545; 526/307.5, 317.1, 318
See application file for complete search history.

(56) References Cited

U.S. PATENT DOCUMENTS

| 3,125,592 | A | | 3/1964 | Nevin |
| 3,224,989 | A | | 12/1965 | Nevin |
| 3,256,225 | A | | 6/1966 | Nevin |
| 3,291,764 | A | | 12/1966 | Findlley |
| 3,450,613 | A | | 6/1969 | Steinberg |
| 3,676,384 | A | | 7/1972 | Rheineck et al. |
| 3,878,077 | A | | 4/1975 | Borden et al. |
| 3,931,075 | A | | 1/1976 | Trecker et al. |
| 3,979,270 | A | | 9/1976 | Trecker et al. |
| 4,025,477 | A | | 5/1977 | Borden et al. |
| 4,438,228 | A | | 3/1984 | Schenck |
| 4,740,367 | A | | 4/1988 | Force et al. |
| 5,073,470 | A | * | 12/1991 | Kato et al. ............ 430/114 |
| 5,356,972 | A | | 10/1994 | Sperling et al. |
| 5,523,350 | A | | 6/1996 | Venkataswamy et al. |
| 5,578,297 | A | | 11/1996 | Mellul et al. |
| 5,719,301 | A | | 2/1998 | Sleeter |
| 5,866,628 | A | | 2/1999 | Likavec et al. |
| 6,121,398 | A | | 9/2000 | Wool et al. |
| 6,184,267 | B1 | * | 2/2001 | Kato et al. ............ 523/160 |

FOREIGN PATENT DOCUMENTS

| DE | 3938149 | | 5/1991 |
| EP | 0 072 114 A1 | * | 2/1983 |
| EP | 0081973 | | 6/1983 |
| EP | 0437001 | | 7/1991 |
| FR | 7637678 | | 7/1978 |
| GB | 1248919 | | 10/1971 |
| JP | 48-98883 | | 12/1973 |
| JP | 48-98885 | | 12/1973 |
| JP | 48-102647 | | 12/1973 |
| JP | 49-103144 | | 9/1974 |
| JP | 50-126706 | | 6/1975 |
| JP | 53-026116 | | 3/1978 |
| JP | 54-070397 | | 6/1979 |
| JP | 55 011525 | * | 1/1980 |
| JP | 56-159222 | | 12/1981 |
| JP | 57-190016 | | 11/1982 |
| JP | 09 169089 | * | 6/1997 |

OTHER PUBLICATIONS

La Scala, J.J., E.J. Robinette, J.M. Sands, and G.R. Palmese, "Fatty Acid-Based Monomers and Styrene Replacements for Liquid Molding Resins," *Proceedings of the 48th International SAMPE Symposium/Exhibition*, Long Beach, CA, May 2003.
Devia, N., J.A. Manson, L.H. Sperling, A. Conde, "Simultaneous Interpenetrating Networks Based on Castor Oil Elastomers and Polystyrene. III. Morphology and Glass Transition Behavior," *Polymer Eng. Sci.*, 1979, 19, 869.
Devia, N., J.A. Manson, L.H. Sperling, A. Conde, "Simultaneous Interpenetrating Networks Based on Castor Oil Elastomers and Polystyrene. IV. Stress-Strain and Impact Loading Behavior," *Polymer Eng. Sci.*, 1979, 19, 878.
Devia, N., J.A. Manson, L.H. Sperling, A. Conde, "Simultaneous Interpenetrating Networks Based on Castor Oil Elastomers and Polystyrene. 2. Synthesis and Systems Characteristics," *Macromolecules*, 1979, 12, 360.
A. Guo, I. Javni, Z. Petrovic, "Rigid Polyurethane Foams Based on Soybean Oil," *J. Appl. Polym. Sci.*, 77, 467 (2000).
H.M. Teeter, M.J. Geerts, J. Cowan, "Polymerization of Drying Oils. III. Some Observations on Reaction of Maleic Anhydride With Methyl Oleate and Methyl Linoleate," *J. Am. Oil Chem. Soc.* 25, 158, (1948).
G. King, "The Mechanism of the Oxidation of Oleic and Elaidic Acids and their Methyl Esters by Hydrogen Peroxide in Acetic Acids, Further Observations on the Configurations of the 9:10-Dihydroxic Acids," *Chemical Society Journal London*, 37 (1943).
Daniel Swern, G.N. Billen, T.W. Findley, J.T. Scanlan, "Hydroxylation of Monosaturated Fatty Materials with Hydrogen Peroxide," *J. Org. Chem.*, 67, 1786 (1945).
N. Bouqillon, C. Fringant, "Polymer Networks Derived From Curing Of Epoxidised Linseed Oil: Influence Of Different Catalysts And Anhydride Hardeners," *Polymer*, 41, 8603 (2000).
F. Li, R. LaRock, "New Soybean Oil-Styrene-Divinylbenzene Thermosetting Copolymers. II. Dynamic Mechanixal Properites," *J. Poly Sci., Part B: Poly Phys.*, 38, 2721, (2000).

(Continued)

*Primary Examiner*—Ling-Siu Choi
(74) *Attorney, Agent, or Firm*—Knoble, Yoshida & Dunleavy

(57) ABSTRACT

Novel fatty acid monomers and methods for their synthesis are provided for use in polymerization reactions. Fatty acid monomers are employed as reactive diluents in the polymerization of vinyl esters and polyesters for one or more purposes selected from improving the fracture resistance, lowering the processing viscosity and reducing the volatile organic compounds present in the polymerization mixture.

8 Claims, 1 Drawing Sheet

OTHER PUBLICATIONS

J. Rosch and R. Mulhaupt, "Polymers from renewable resoureces: polyester resins and blends based upon anhydride-cured epoxidized soybean oil," *Polymer Bull.,* 31, 679 (1993).

Crivello, J.V., R. Narayan, S.S. Sternstein, "Fabrication and Mechanical Characterization of Glass Fiber Reinforced UV-Cured Composites form Epoxidized Vegetable Oils," *J. Appl. Polymer Sci.,* 64, 2073, (1997).

Shogren, R.L., "Preparation and Characterization of a Biodegradable Mulch: Paper Coated With Polymerized Vegetable Oils," *J. Appl. Polymer Sci.,* 73, 2159, (1999).

I. Frischinger, S. Dirlikov, "Toughening of epoxy resins epoxidized vegetable oils," *Polymer Comm.,* 32, 536 (1991).

L.W. Barrett, L.H. Sperling, C.J. Murphy, "Naturally Functionalized Triglyceride Oils Interpenetrating Polymer Networks," *J. Amer. Oil Chem. Soc.,* 70, 523 (1993).

N.B. Trân, J.Vialle, Q.T. Pham, "Castor oil-based ployurethanes: 1. Structural characterization of castor oil-nature of intact glycerides and distribution of hydroxyl groups," *Polymer,* 1997, 38, 2467.

G. Williams, R. Wool, "Composites from Natural Fibers and Soy Oil Resins," *Applied Composite Materials,* 7, 421, (2000).

S. P. Bunker, R. P. Wool, "Synthesis and Characterization of Monomerss and Polymers for Adhesives from Methyl Oleate," *J. Poly. Sci.:Part A, Polym. Chem.,* 40, 451, (2002).

J. LaScala, R. Wool, "The Effect fo Fatty Acid Composition on the Acrylation Kinetics of Epoxidized Triglycerols," *J. American Oil Chemist's,* 79 59-63, (2002).

J. LaScala, R. Wool, "The Effect of FA Composition on the Epoxidation Kinetics of TAG," *J. American Oil Chemist's,* 79 373-378, (2002).

S. Khot, J. LaScala, E. Can, S. Morye, G. Williams, G. R. Palamese, S. Kusefoglu, R. Wool, "Development and Application of Triglyceride-Based Polymers and Composites," *J. Appl. Polymer Sci.,* 82, 703, (2001).

La Scala, J.J., E.J. Robinette, G.R. Palmese, J.M. Sands, J.A. Orlicki, and M.S. Brachter, "Successful Initial Development of Styrene Substitutes and Suppressants for Vinyl Ester Resin Formulations," *Army Research Laboratory Technical Report,* ARL-TR-3023, Aug. 2003.

Kirschenbauer, H.G., "Fats and Oils: An Outline of Their Chemistry and Technolgy," *Reinhold Publishing:* New York, 1960.

Sands, J.M., G.R. Palamese, "Greening Future Military Composite Platforms by Controlling Volatile Organic Compound Emissions from Vinyl Ester Resins," *SERDP Partners in Environmental Technology,* Washington, DC Dec. 3-5, 2002.

Sands, J.M., G.R. Palamese, J.J. LaScala, E.J. Robinette, M. Brachter, S.H Mcknight, J. Orlicki, C.A. Ulven, U.K. Vaidya, "Low-Cost and High-Impact Environmental Solutions for Military Composite Structures," *Annual SERDP Report, PP-1271* .

R. P. Wool, J. Lu, E. Can, W. Thielemans, L. Zhu, L. Bonnaillie, J. LaScala, C. Hong, M. Dweib, I. McAninch, A. Kulbick, B. Hu, H. Shenton, III, "Bio Based Composites," ECCM-11 Rhodes, Jun. 1, 2004.

S. Bunker, C. Staller, N. Willenbacher, R. Wool, "Miniemulsion Polymerization of Acrylated Methyl Oleate For Pressure Sensitive Adhesives," *International Journal of Adhesion & Adhesives* 23 (2003) 29-38 .

A. Guo, Y. Cho, Z. Petrović, "Structure and Properties of Halogenated and Nonhalogenated Soy-Based Polyols," *Journal of Polymer Science: Part A: Polymer Chemist,* vol. 38, 3900-3910 (2000).

A. Guo, D. Demydov, W. Zhang, Z. Petrović, "Polyols and Polyurethanes from Hydroformylation of Soybean Oil," *Journal of Polymers and Environment,* vol. 10, Nos. 1/2, 49-52, Apr. 2002.

J. J. LaScala, J. M. Sands, J.A. Orlick, E.J. Robinette, G.R. Palmese, "Fatty Acid-Based Monomers as Styrene Replacements for Liquid Molding Resins," Poster presented at AICHE, FA, 2003.

J. Chantler, R. Carteaux, G. McCunn, "Soybean SMC," *Composites 2002 Convention and Trade Show,* Atlanta Georgia, Sep. 25-27, 2002.

* cited by examiner

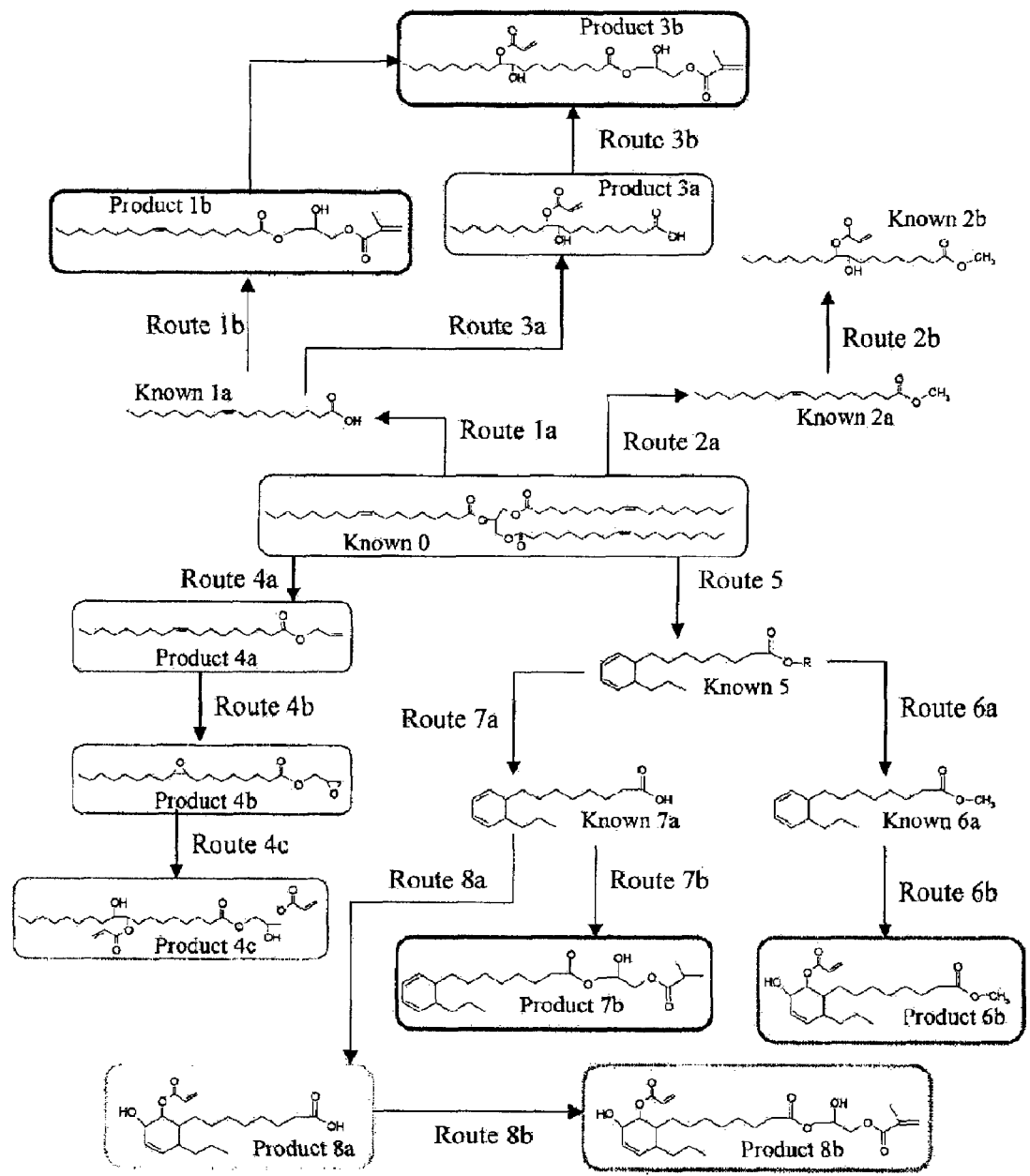
Figure 1: The proposed synthetic routes to produce fatty acid-based monomers.

FATTY ACID MONOMERS TO REDUCE EMISSIONS AND TOUGHEN POLYMERS

CROSS REFERENCE TO RELATED APPLICATIONS

This application claims the benefit of U.S. provisional patent application No. 60/569,379, filed on May 7, 2004, pursuant to 35 U.S.C. §119(e).

BACKGROUND OF THE INVENTION

1. Field of the Invention

The present invention relates to the fatty acid monomers and the preparation of vinyl ester resins with low volatile organic compound (VOC) content using fatty acid monomers to reduce hazardous air pollutant (HAP) emissions.

2. Brief Description of the Related Technology

Styrene is the most common reactive diluent used in thermosetting liquid molding resins. Recently, the Federal Environmental Protection Agency of the United States of America introduced legislation to address hazardous emissions from composite manufacturing and repair by enacting new emission standards through the "National Emission Standards for Hazardous Air Pollutants: Reinforced Plastic Composites Production," which specifically targets styrene, methyl methacrylate, and methylene chloride as regulated hazardous air pollutants. Volatile organic compound emissions are liberated during all of the phases of composite fabrication. Styrene emissions occur during the mixing of diluents, catalysts, and initiators into the system. Composite parts typically have very large surface to volume ratios, which allows up to 20% of the styrene content to be lost during the molding stage. During cure, elevated temperatures increase the vapor pressure of styrene and thus increase the rate of VOC emissions. Unfortunately, even after cure during the lifetime of the part, styrene emissions can be substantial. Past work has shown that up to 50% of the styrene is unreacted after cure. Therefore, liberation of VOC emissions must be mitigated not only during composite processing, but also during curing and fielding of the composite part.

Simply reducing the styrene content in VE resins causes two problems. First of all, the resin viscosity increases unacceptably. The second problem is that the fracture toughness of these resins decreases as the styrene content is reduced. Low molecular weight vinyl ester monomers can be used to reduce the resin viscosity, but they detrimentally affect the fracture properties. This is the problem with Dow Derakane™ 441-400, which uses low molecular weight vinyl ester monomers and only 33 wt % styrene. The viscosity is approximately 400 cP, which is acceptable for liquid molding operations. On the other hand, the fracture toughness is only ~100 J/m².

Vinyl esters are used in military and commercial applications because of their high performance, low weight, and low cost. Although it is important to reduce the styrene content in these resins, the fracture toughness of VE resins must be improved for military, automotive, and other applications. Many methods have been used to toughen these resins, but with little success.

A simple way to improve impact performance of thermosets is through matrix toughening, or decreasing the crosslink density of the network. Previous work shows that this method works for vinyl esters. Synthesizing vinyl ester monomers with a higher molecular weight decreases the crosslink density and gives the network more molecular flexibility. A more flexible network corresponds to a tougher system; however, direct losses are experienced in other mechanical and thermal properties such as modulus and glass transition temperature ($T_g$). In addition, increasing vinyl ester molecular weight also increases resin viscosity. This viscosity increase could prohibit the use of inexpensive liquid molding techniques for composite fabrication.

To avoid significant plasticization of the matrix, other methods for toughening can be found in the literature and have been used commercially. Second phase toughening with rubber modifiers that precipitate from solution is one such method. It has been shown that thermosetting systems, such as epoxies, can be toughened through rubber modification. For example, phase separation of a carboxyl-terminated rubber (CTBN) from a reacting mixture of diglycidyl ethers of bisphenol-A (DGEBA) and diamines (e.g. diamino diphenyl sulfone) results in a well-dispersed phase of rubber particles having typical dimensions of 1 μm and a material with improved toughness. For higher molecular weight DGEBA systems, the increase in fracture toughness is dramatic, reaching up to one order of magnitude. The rubber modifier must be miscible with the resin at room temperature and should fully precipitate from solution during cure to avoid plasticizing the epoxy phase.

Because rubber modification of epoxies has been successful, it should follow that toughening vinyl esters would experience the same type of success. Dreerman and coworkers attempted to toughen vinyl ester using an epoxy terminated (ETBN) and vinyl terminated (VTBN) butadiene-acrylonitrile rubber. They found that ETBN yielded the highest degree of toughening with approximately 70% increase in $K_{1c}$. This pales in comparison to toughened epoxies, which exhibit over an order of magnitude increase in $G_{IC}$ from unmodified epoxies. Also the rubber modifiers were not compatible with the vinyl ester, which is a necessary condition for rubber toughening. Attempts to improve the compatibility (increased temperature, ultrasonic treatment, and surfactants) were not successful. Ullet reported similar trends when toughening vinyl ester. Two-phase mixtures were reported for butadiene-acrylonitrile based rubber modifiers. Compatibilizing agents improved the solubility of the rubber, but hindered the phase separation during cure. Also, a relatively low increase in $K_{1c}$ (116%) was achieved. Siebert and coworkers were able to obtain higher levels of toughness, as high as a 540% increase in $K_{IC}$. Unfortunately, this toughening required relatively high rubber levels and resulted in a significant plasticization of the vinyl ester matrix. Similar problems with toughening vinyl esters were experienced by other research groups as well.

Reactive diluents other than styrene have been used to reduce both VOC and HAP emissions. 2-hydroxymethacrylate has been used, but the resin viscosity and properties of the resulting polymers are inferior to that of styrene-based thermosetting resins. In addition, 2-hydroxymethacrylate produces significant VOC emissions. Ortho and para-methyl styrene have lower volatilities than styrene; however, these chemicals still produce significant VOCs and would probably be classified as HAPs if used on a large scale.

Additives, such as paraffin waxes, have been used to suppress styrene emissions. Yet, these resins suffer from poor polymer performance and poor interfacial adhesion in fiber-matrix composites. Furthermore, studies have shown that these additives do not effectively decrease styrene emissions during the time-scale of use.

There are a number of reasons why the study and development of fatty acid-based monomers for use in liquid molding resins is important. First of all, fatty acid monomers can be used to replace some or all of the styrene used in liquid thermosetting resins. Fatty acid monomers are excellent alternatives to styrene because of their low cost and low volatility. Furthermore, fatty acids are derived from plant oils, and are therefore a renewable resource. Thus, not only would the use of fatty acids in liquid molding resins reduce health and environmental risks, but it also promotes global sustainability.

Fatty acids and triglycerides have been used in a number of polymeric applications. The preparation of epoxidized and hydroxylated fatty acids has been reviewed by many researchers, including Gunstone, Litchfield, Swern, etc. Epoxidized and acrylated triglycerides have been used as plasticizers and toughening agents. In fact, the largest non-food use of triglycerides is the use of epoxidized soybean and linseed oils as plasticizers in poly(vinyl chloride). Epoxidized triglycerides have also been studied for use as toughening agents in epoxy polymers.

The production of free radically reactive plant oil-based monomers is a more recent invention. Nevin patented the preparation of acrylated triglycerides in U.S. Pat. No. 3,125,592, which can be homopolymerized or copolymerized with other free-radically reactive monomers. These acrylated triglycerides have been used in coatings, inks, toughening agents, and adhesives. Using this technology, adhesives have been made from fatty acid methyl esters. In addition, thermosetting liquid molding resins have been made using chemically modified plant oils as cross-linking agents in thermosetting resins (U.S. Pat. No. 6,121,398). Anhydrides, such as phthalic anhydride, have been used to form air curable coatings (Japanese Patent nos. 73-125724, 74-103144, 80-62752, and 81-64464). In addition, the use of maleic anhydride for making free-radically reactive triglycerides has been patented (U.S. Pat. No. 6,121,398). However, until now, fatty acids have not been used as reactive diluents in thermosetting liquid molding resins.

SUMMARY OF THE INVENTION

In a first aspect, the invention relates to fatty acid monomers. A novel application of these monomers includes the use as non-volatile reactive diluents in resins for composite fabrication including, but not limited to, liquid molding, filament winding, wet lay-up and other techniques requiring low initial viscosity.

In a second aspect, the present invention relates to processes for the synthesis of fatty acid monomers.

In a third aspect of the invention, fatty acid monomers can be used to replace some or all of volatile reactive diluents in liquid molding resins.

In a fourth aspect, the present invention relates to the preparation of low VOC vinyl ester reins including fatty acid monomers as non-volatile reactive diluents.

BRIEF DESCRIPTION OF THE DRAWINGS

FIG. 1 shows the proposed synthetic routes to produce fatty acid-based monomers.

DETAILED DESCRIPTION OF THE PREFERRED EMBODIMENTS

In a first aspect, the present invention relates to fatty acid monomers for use as non-volatile reactive diluents in resins for composite fabrication including, but not limited to, liquid molding, filament winding, wet lay-up and other fabrication techniques requiring low initial viscosity. The present invention a reactive diluents, such as styrene, which suffer from the problem of causing harmful VOC emissions, are typically used in liquid molding resins to decrease the viscosity of the liquid resin and increase the toughness of the resulting polymers.

Most reactive diluents are volatile organic compounds and hazardous air pollutants. Because of the relatively high molecular weight of fatty acids, fatty acid monomers are generally non-volatile under typical fabrication and use conditions. Fatty acid-based reactive diluents have low viscosities and contain vinyl groups capable of free-radical polymerization. Furthermore, some of these fatty acid monomers cure with vinyl ester to yield polymers with smooth non-tacky surfaces. This indicates that oxygen inhibition is not significant. As a result, certain fatty-acid based polymers may require little to no surface preparation for use, unlike typical thermosetting polymers. Moreover resins have been formulated using these fatty acid monomers that possess properties comparable to those of styrene based vinyl esters, and polyesters. Thus the invention includes the novel fatty acid monomers, as well as the formulations of these fatty acids with acrylate or methacrylate vinyl esters, unsaturated polyesters, and any other free-radically reactive cross-linking systems.

Vinyl esters suitable for use in the invention include, but are not limited to, methacrylated and acrylated glycidyl ethers of bisphenols. Suitable bisphenols include, but are not limited to, bisphenol A, hexafluorobisphenol A, bisphenol E, bisphenol F, tetramethyl bisphenol E, tetramethyl bisphenol F, bisphenol M, bisphenol C, bisphenol P and bisphenol Z. Methacrylates and acrylates of ethoxylated bisphenols may also be employed.

Vinyl esters having a vinyl functionality greater than two may also be employed. This includes systems such as: acrylic and alkyl-acrylic vinyl esters of epoxy novolacs, acrylates tris-hydroxyphenylmethane glycidyl ether (THPM-GE), ethoxy phenol novolacs, and ethoxylated tris-hydroxyphenylmethane. Also, brominated versions of the above systems, such as, for example, brominated bisphenol A based vinyl esters, may be employed. Preferred vinyl esters are the bisphenol vinyl esters due to the desirability of making structural composites from the resultant polymers.

A number of synthetic procedures can be employed for making fatty acid-based monomers to be used as a reactive diluent in vinyl ester resins. FIG. 1 lists some of the synthetic routes that can be employed. In all of the synthetic routes, the starting materials are selected from triglycerides (Known 0), fatty acids (Known I a), fatty acid methyl esters (Known 2a), and cyclic fatty acids (Known 5a). Refined plant oils contain approximately 99% triglyceride molecules. Industrially, fatty acids (FA) are produced from triglycerides by reaction with a strong acid, such as HCl. Fatty acid methyl esters (FAME) are produced by a methanolysis reaction. In this reaction, methanol replaces the glycerol ester linkages of the fatty acids under basic conditions. Cyclized fatty acids may be produced by reacting polyunsaturated fatty acids of triglycerides at high temperatures under basic conditions.

In synthetic Route 1b, fatty acids are reacted with an epoxy-vinyl species, such as glycidyl methacrylate (GM). The carboxylic acid group of each of the fatty acids adds to the epoxide group on glycidyl methacrylate. The resulting species of glycidyl methacrylate fatty acid may be a fairly long hydrocarbon (typically 12-26 atoms in length depending on the fatty acid used) with a terminal unsaturation site that is capable of free radical polymerization (Product 1b). The length of the fatty acid chain affects the resin and polymer properties. Therefore, the particular fatty acid used has an effect on the polymer properties, thereby allowing customization of the polymer by selection of the fatty acid monomer(s).

Any fatty acid can be methacrylated using glycidyl methacrylate. For example, butyric acid, capric acid, caprylic acid, lauric acid, myristic acid, palmitic acid, stearic acid, oleic acid, and linoleic acid were all used as starting materials for such methracrylation reactions. Mixtures of the fatty acids found in safflower oil were also used for methacrylation reactions.

Epoxides, such as glycidyl methacrylate, react with fatty acids at temperatures below 100° C. with short reaction times, if properly catalyzed. A chromium based catalyst, AMC-2™ (Aerojet Chemicals, Rancho Cordova, Calif.) has been successfully used to catalyze this reaction in amounts ranging from 0.5-2.0 wt %, based on the total weight of the reaction mixture.

Alternatively, 0.1-3.0 wt % of a 3:1 ratio of triphenyl antimony ($SbPh_3$) to triphenyl phosphine ($PPh_3$) catalyst can be used to catalyze the reaction of epoxides with fatty acids. Near IR or mid IR (FTIR) can be used to determine the extent of the reaction since the primary epoxide peaks at 4530 $cm^{-1}$ and 917 $cm^{-1}$ can be tracked during the reaction. When the reaction has gone to completion, the epoxide peaks disappear, indicating substantially complete consumption of the epoxide during the reaction.

In synthesis Route 2b, unsaturation sites on fatty acid methyl esters are first epoxidized, and then reacted with a vinyl carboxylic acid, such as acrylic acid or methacrylic acid. The resulting monomer (Known 2b) includes an acrylate or methacrylate group, which is capable of free radically polymerizing, in the middle of a long hydrocarbon chain (20 atoms long). Ideally, this monomer will have only a single acrylate group. For this to be the case, monounsaturated fatty acids need to be used. Pure mono-unsaturated acids are fairly expensive. Canola oil and olive oil are relatively inexpensive sources of mono-unsaturated acids, but they each have significant contents of saturated and polyunsaturated acids. The preparation of acrylated epoxidized fatty acid methyl esters is described elsewhere.

Di-functional monomers can be used to improve the properties of vinyl ester resins by providing additional crosslinking as well as decreasing the amount of unreacted monomer in the cured polymer. Synthesis Route 3 shows a way to produce di-functional monomers (Product 3b) by combining the synthetic procedures of synthesis Routes 1 and 2. Free-radically reactive fatty acids (Product 3a) are an intermediate, which are believed to be novel. These species can be used to create free-radically reactive surfactants by simple addition of the free-radically reactive fatty acid with aqueous sodium bicarbonate.

Allyl alcohol (AOH) is used to break up the triglycerides into allyl fatty acid monomers (synthesis Route 4a, Product 4a) in a procedure that is very similar to the methanolysis reaction. These monomers (AOH-FA) have a primary unsaturation site that could potentially be used for free radical polymerization. In addition, the unsaturation site can be epoxidized to form fatty acids with both primary and secondary epoxide groups (synthesis Route 4b, Product 4b). This product can be used as an epoxy chemical for various applications, such as a chain extender in epoxy resins. In addition, the epoxide groups can be reacted with a vinyl acid, such as acrylic acid, to yield fatty acids with free-radical functionality at both the center and end of the fatty acid chains (Product 4c).

Allyl alcohol was used to break apart the glycerol linkage of triglycerides in soybean oil to produce allyl alcohol modified fatty acids (AOH-FA) (Product 4a). The reaction mixture contained 70 g oil (soybean oil), 22 ml allyl alcohol, and 25.5 ml of a 0.5 N KOH/allyl alcohol solution. The contents were mixed and reacted at 60° C. for 3 days. Afterwards, the reaction products were recovered using an ether extraction, as for the methanolysis reaction. The level of functionalization with allyl alcohol was measured using $^1$H-NMR. Results have shown that the allyl alcoholysis reaction proceeds to about 80% completion. Other plant oils, including olive oil and canola, were modified in the same manner with the same results. Therefore, this method can be applied to all triglyceride oils. Epoxidation of the allyl unsaturation sites can be done using peroxyacetic acid or transition metal complexes, as described elsewhere.

Synthetic Routes 6-8 make use of the cyclized derivatives of triglycerides. In synthetic Route 6, a methyl ester of the cyclized species is formed via methanolysis (Known 6a). The remaining unsaturation sites on the fatty acid are then epoxidized and acrylated to add free radical functionality to the fatty acid (Product 6b). In Route 7, cyclized fatty acids are produced by acidolysis of cyclized triglycerides (Known 7a). This species is then reacted with glycidyl methacrylate, in the same manner as Route 1, to attach vinyl functionality to the end of the cyclized fatty acid. Route 8 is just a combination of Routes 6 and 7, resulting in di-vinyl, cyclized fatty acid monomers (Product 8b).

The fatty acids employed to make the fatty acid monomers of the invention can be obtained from any suitable source of triglycerides. Suitable renewable plant sources of fatty acids include, but are not limited to, almond seed oil, arachis (groundnut) oil, canola oil, castor oil, catnip oil, cedarwood oil, citronella oil, coprah oil, corn oil, cottonseed oil, garlic oil, jojoba oil, linseed oil, neem oil, olive oil, palm oil, palm kernal oil, peanut oil, perilla oil, rapeseed oil, rice bran oil, safflower oil, sesame oil, soja oil, soybean oil, sunflower oil, tall oil, tung oil, butter, lard, tallow, vernonia, yellow grease, camelina, carthame, grape seed, hazelnut, poppy seed oil, walnut oil, avocado pear, black-currant, borage, cacao, evening primrose, kukui oil and wheat germ oil.

Exemplary classes of fatty acids that may be employed to make the fatty acid monomers of the present invention include, but are not limited to, straight chain fatty acids, branched chain fatty acids, and ring containing fatty acids. Straight chain fatty acids include saturated fatty acids, monoenoic fatty acids, polyenoic fatty acids, acetylenic fatty acids, hydroxy fatty acids, dicarboxylic fatty acids, divinyl ether fatty acids, sulfur-containing fatty acids, fatty acid amides, methoxy fatty acids, keto fatty acids, and halogenated fatty acids. Branched chain fatty acids include branched alkyl fatty acids, branched methoxy fatty acids and branched hydroxy fatty acids (mycolic acids). Ring-containing fatty acids include cyclopropane fatty acids, cyclopentenyl fatty acids, furanoid fatty acids, cyclohexyl fatty acids, phenylalkanoic fatty acids, epoxy fatty acids and lipoic fatty acids.

Exemplary fatty acids that may be employed to make the fatty acid monomers of the present invention, include, but are not limited to, butyric acid, capric acid, caprylic acid, lauric acid, myristic acid, palmitic acid, stearic acid, oleic acid and linoleic acid.

These fatty acid monomers were designed to replace some or all of the high VOC chemicals (e.g., styrene) that are typically employed in thermosetting liquid molding resins. Fatty acid monomers have low volatilities, low cost, low viscosities, and are reactive with other vinyl monomers. Therefore, these monomers are ideal as replacements for styrene in vinyl ester, unsaturated polyester, and other thermosetting liquid molding resins.

The monomers described herein produce resins and polymers with properties comparable to commercial thermosetting liquid molding resins. Therefore, these fatty acid monomers can be used for the production of polymer matrix composites, which are used in military, automotive, recreational, and marine applications. Specific items made from these materials include body panels and armor for vehicles, composite hoods, and boat hull structures. In addition, these materials can be used with traditional thermosetting vinyl and polyester resins to serve as gel coating matter providing a protective coating.

In addition, these monomers can be polymerized to form linear, branched, hyperbranched, and cross-linked polymers for other applications. Possible applications include biosensors, rheology modifiers, biomaterials, and polymerizable surfactants for media encapsulation.

Ternary blends of VE, styrene, and fatty acid monomers produced polymers with better fracture properties than their binary counterparts, including vinyl ester/styrene resins. This occurred because of a combination of fewer defects and higher moduli. The fatty acids allowed for high vinyl ester monomer conversion, while the styrene caused a high overall conversion, resulting in a lower content of dangling chain ends relative to the binary blends. Fracture theories, such as vector percolation, show that fracture properties increase with increasing modulus if the connectivity of the polymer is unaffected. As shown previously, increasing the styrene content increased the rigidity of the ternary blends, therefore causing an increase in the fracture properties.

Another interesting aspect of these ternary polymer blends was that the VE/GM-FA/styrene blends cured in open molds with a perfectly hard finish. There was no uncured layer that typically forms due to oxygen inhibition, resulting in a tacky finish. These materials do not need to be polished to form a good and useable surface. As a result, the financial, production, and environmental implications of this result are enormous. A possible reason for this is that the high hydrocarbon content of the resin formed a waxy layer at the surface. However, unlike waxes, these hydrocarbons were functionalized enabling them to react into the polymer network.

EXAMPLES OF FATTY ACID MONOMER SYNTHESIS

Example 1

The reaction between a stoichiometric amount of oleic acid (OA) and glycidyl methacrylate (GM) was catalyzed with 2 wt % AMC-2™ catalyst and run at room temperature. The reaction went to ~90% completion after 3 days of reaction.

Examples 2-4

The reaction between a stoichiometric amount of oleic acid and glycidyl methacrylate was catalyzed with 0.5 wt %, 1 wt %, and 2 wt % AMC-2™ catalyst and run at 70° C. The reaction went to completion in 1.5 hrs when 2 wt % catalyst was used. The reaction went to completion after 2.5 hours when 1 wt % catalyst was used. When 0.5 wt % catalyst was used, the reaction took longer than 4 hours.

Examples 5-7

The effect of higher reaction temperatures on the reaction of oleic acid and glycidyl methacrylate was studied using 1 wt % AMC-2™ catalyst. Reaction temperatures of 80° C., 90° C., and 100° C. were used. It was found that increasing temperature decreased the reaction time necessary to reach complete reaction of the epoxides. However, at 100° C., HPLC results show the formation of some higher molecular weight species. This indicates that undesirable epoxy homopolymerization (etherification) occurred to some extent at 100° C.

Example 8

The $SbPh_3/PPh_3$ catalyst also effectively catalyzed the acid-epoxy reaction between fatty acids and glycidyl methacrylate. For the reaction of glycidyl methacrylate with oleic acid using 1 wt % of this catalyst mixture, the reaction went to completion after 5 hours of reaction at 70° C.

In order to simultaneously minimize the catalyst concentration and reaction time, 0.5-2.0 wt % of a suitable catalyst such as AMC-2™ may be employed, whereas use of 1 wt % AMC-2™ was found to be optimum for the reaction of glycidyl methacrylate and oleic acid. Reaction temperatures ranging from 60-90° C. were found to maximize the extent of reaction while minimizing the extent of side reactions.

Examples 9-14

Glycidyl methacrylate was reacted with stoichiometric amounts of lauric acid, stearic acid, oleic acid, linoleic acid, linolenic acid, and a mixture of the fatty acids of safflower oil using 1 wt % AMC-2™ at reaction temperatures ranging from 60- 90° C. The conversion of the reactants to the desired product was nearly complete (>95%). HPLC results showed that substantially no higher molecular weight species were formed. In addition, $^1$H-NMR confirmed the structure and functionality of these methacrylated fatty acids. This demonstrates to a skilled person that any fatty acid can be successfully modified in this manner to produce a fatty acid monomer.

Example 15

Methacrylated lauric acid was prepared by reacting 5897 g lauric acid with 4166 g glycidyl methacrylate in the presence of 51 g AMC-2 catalyst. The reaction was run in a 20 L vessel while stirring vigorously with a mechanical stirrer. The reaction was run at 50° C. for 16 hrs. The product was a green liquid. Acid number titration showed that little unreacted fatty acids remained, as the acid number was less than 5. FTIR results showed that the epoxy group of glycidyl methacrylate at 910 $cm^{-1}$ was gone. NMR results proved that reaction occurred between the fatty acid of oleic acid and the epoxy of glycidyl methacrylate. NMR showed than no epoxies remained, while 0.98 methacrylate groups were present per fatty acid segment. The viscosity was 48 cP at 30° C. using a Brookfield Viscometer.

Example 16

Methacrylated oleic acid was prepared by reacting 108.1 g oleic acid with 54.4 g glycidyl methacrylate in the presence of 1.6 g AMC-2 catalyst. The reaction was run at 55° C. for 3.5 hrs and then for 2.5 hrs at 70° C. The product was a green liquid. Acid number titration showed that little unreacted fatty acids remained, as the acid number was less than 5. FTIR results showed that the epoxy group of glycidyl methacrylate at 910 $cm^{-1}$ was gone. NMR results proved that reaction occurred between the fatty acid of oleic acid and the epoxy of glycidyl methacrylate. NMR showed than no epoxies remained, while 0.98 methacrylate groups were present per fatty acid segment. The viscosity was 60 cP at 30° C. using a Brookfield Viscometer.

Example 17

Methacrylated butyric acid was prepared by reacting 57.4 g butyric acid with 92.6 g glycidyl methacrylate in the presence of 1.5 g of AMC-2 catalyst. The reaction was run at 90° C. for 3 hours. The product was a green liquid. Acid number titration showed that little unreacted fatty acids remained, as the acid number was less than 5. FTIR results showed that the epoxy group of glycidyl methacrylate at 910 cm$^{-1}$ was gone. HPLC results showed that the complete conversion of the methacrylated butyric acid. The viscosity of methacrylated butyric acid was found to be 24 cps at 24° C. using a Brookfield viscometer.

Example 18

10 g methacrylate oleic acid was placed in a 20 mL vial, with the lid screwed on tightly. The sample was allowed to sit for 2.5 years at room temperature in a dark cabinet. During this time, gelation did not occur.

Example 19

Methyl oleate in the amount of 63.1 g was epoxidized in the presence of 64.35 g hydrogen peroxide (30% aqueous) and 20.7 g formic acid. The reaction was allowed to run for 16 hrs while mechanically mixing. The epoxidized oil was ether extracted. The ether was evaporated under vacuum at 40° C. NMR results show that the extent of epoxidation was 0.94 epoxies per fatty acid methyl ester. The product was a white solid-liquid mixture.

Example 20

62.43 g of the epoxidized methyl oleate in example 19 were reacted with 19.74 g acrylic acid at 85° C. for 6 hrs. AMC-2 catalyst and hydroquinone were used in the amounts of 1.25 g and 0.199 g, respectively. The product was ether extracted to remove hydroquinone and unreacted acrylic acid. The ether was evaporated at 40° C. under vacuum. NMR results showed the extent of acrylation was 0.90 based on the initial level of unsaturation (i.e., 0.9 acrylates per molecule). The viscosity was 56 cP at 30° C. using a Brookfield Viscometer. The product was a brown-green liquid.

Example 21

10 g of the product from example 17 was epoxidized using 5.35 g hydrogen peroxide (30 wt % aqueous) and 3.33g formic acid, along with 0.01 g hydroquinone to reduce the likelihood of polymerization. The reaction was allowed to run for 16 hours, at room temperature while mechanically mixing. The epoxidized oil was ether extracted. The ether was evaporated under vacuum at 40° C. NMR results showed that the extent of epoxidation was 0.8 epoxies per fatty acid. 9.0 g of epoxidized product was reacted with 1.68 g acrylic acid, in the presence of 0.21 g AMC-2 and 35 mg hydroquinone. The product was ether extracted, and the ether was evaporated under vacuum at 40° C. The product contained 0.25 acrylates and 0.95 methacrylates per fatty acid. The resulting monomer was a brown-green liquid.

Example 22

Alcoholoysis of soybean oil was run using allyl alcohol. 60.0 g of soybean oil was reacted with 22.1 mL allyl alcohol plus 18.3 mL 0.5 N potassium hydroxide in allyl alcohol. The reaction was run at 62° C. for 4 days. The products were separated using an ether extraction. The ether was evaporated at 40° C. under vacuum. NMR showed that the final product had 0.82 allyl groups per fatty acid. The viscosity was 10 cP at 30° C. using a Brookfield Viscometer. The final monomer was a yellow low viscosity liquid.

Example 23

2.0 g linseed oil were reacted with a mixture of 8.2 g ethylene glycol and 2.0 g potassium hydroxide at 240° C. for 3 days. The final product was ether extracted and the ether was evaporated under vacuum at 40° C. NMR showed that there were 2.05 unsaturation sites per fatty acid and an extent of cyclization of 4%. The product was an orange-brown liquid.

Novel fatty acid monomers in accordance with the present invention may be selected from the following:

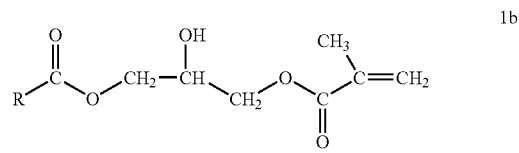

1b

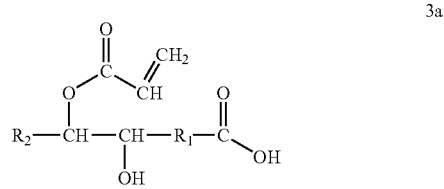

3a

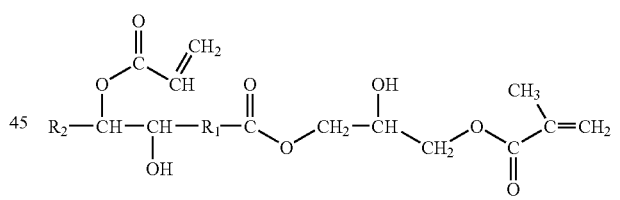

3b

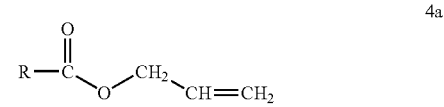

4a

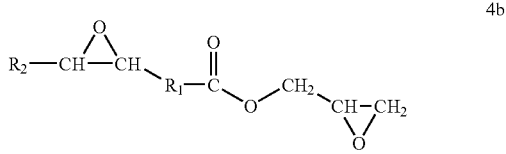

4b

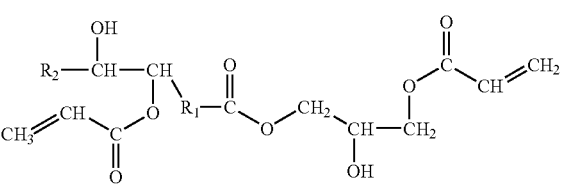

4c

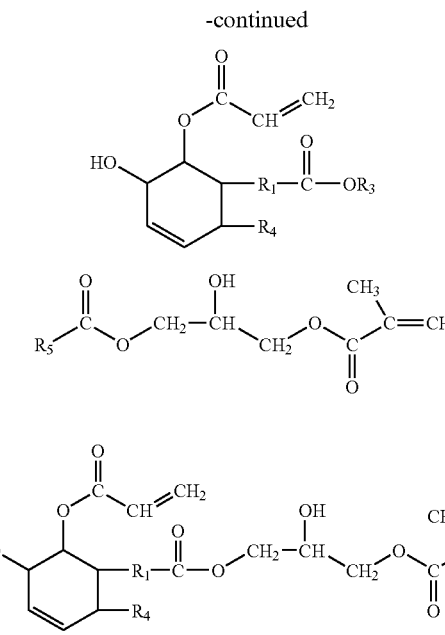

wherein, R, $R_2$, and $R_4$ are any fatty acid residue, specifically including any $C_2$-$C_{30}$ saturated alkyl residue, unsaturated alkyl residue; acetylenic alkyl residue, hydroxy alkyl residue, carboxylic acid alkyl residue, divinyl ether alkyl residue, sulfur-containing alkyl residue, amide alkyl residue, methoxy alkyl residue, keto alkyl residue, halogenated alkyl residue, branched methoxy alkyl residue, branched hydroxyl alkyl residue, epoxy alkyl residue, and fatty acyl-CoA alkyl residue, ring-containing alkyl residue, including cyclopropane alkyl residues, cyclopentenyl alkyl residues, cyclohexyl alkyl residues, furanoid alkyl residues, phenylalkanoic alkyl residues, and lipoic alkyl residues.

$R_1$ is any fatty acid segment, specifically including any saturated alkylene segment, unsaturated alkylene segment; acetylenic alkylene segment, hydroxy alkylene segment, divinyl ether alkylene segment, sulfur-containing alkylene segment, amide alkylene segment, methoxy alkylene segment, keto alkylene segment, halogenated alkylene segment, branched methoxy alkylene segment, branched hydroxyl alkylene segment, epoxy alkylene segment, and fatty acyl-CoA alkylene segment, ring-containing alkylene segment, including cyclopropane alkylene segments, cyclopentenyl alkylene segments, cyclohexyl alkylene segments, furanoid alkylene segments, phenylalkanoic alkyl segments, and lipoic alkylene segments of backbone lengths from 1-25 atoms. $R_3$ is selected from the group consisting of H and an alkyl residue having 1-10 carbon atoms. $R_5$ is an unsaturated cyclic alkyl residue having 10-50 carbon atoms and with $R_1$ and $R_4$ functionality.

All of the various aspects of the invention may also employ a free-radical inhibitor, such as hydroquinone, to reduce or prevent gelation of the reaction mixture

EXAMPLES OF THE PREPARATION OF VINYL ESTER

Example 24

Viny ester (VE) was prepared via methacrylation of Epon 828™. 525.7 g Epon 828™ resin was reacted with 243.5 g methacrylic acid. AMC-2 was used as a catalyst for the reaction and to prevent epoxy homopolymerization in the amount of 7.6 g. The reaction was run at about 90° C., but water was periodically flowed through cooling coils within the reactor to keep the temperature below 95° C. After 1 hr and 47 minutes, the acid number of a sample of the reaction contents was found to be 8, and FTIR indicated that there was no peak at 910 cm$^{-1}$, indicating that all of the epoxy reacted. NMR results showed that there were two methacrylate groups per molecule of Epon 828™ resin. GPC results indicated a large single vinyl ester peak at 14.45 min and a small peak at 18.5 minutes representing catalyst, impurities, and unreacted methacrylic acid. The product was a viscous green liquid.

Example 25

Acrylated epoxy (VEA) was prepared via acrylation of Epon 828™. 401.1 g Epon 828™ resin was reacted with 160.0 g acrylic acid. AMC-2 was used as a catalyst for the reaction and to prevent epoxy homopolymerization in the amount of 5.6 g. The reaction was run at about 90° C., but water was periodically flowed through cooling coils within the reactor to keep the temperature below 95° C. After 1 hr and 20 minutes, the acid number of a sample of the reaction contents was found to be 2.6, and FTIR indicated that there was no peak at 910 cm$^{-1}$, indicating that all of the epoxy reacted. NMR results showed that there were two acrylate groups per molecule of Epon 828™ resin. The product was a viscous green liquid.

All of the various aspects of the invention may also employ a free-radical inhibitor, such as hydroquinone, to reduce or prevent gelation of the reaction mixture

EXAMPLES OF RESINS AND POLYMERIZATION REACTIONS

Example 26

MLau from example 15 in the amount of 10.85 g was catalyzed with 0.039 g cobalt naphthenate and 0.169 g Trigonox®. The resin was cured at room temperature for 3 hrs, followed by 3 hrs at 90° C. The resulting clear green polymer was flexible and soft. DMA results showed that the $T_g$ of the resulting polymer is –30° C.

Example 27

7.76 g of the methacrylated lauric acid monomer in example 15 was added to 14.39 g vinyl ester in example 24. The resin viscosity was 1720 cP as measured with a Brookfield Viscometer.

Example 28

33.0 g of the methacrylated fatty acid monomer in example 15 was added to 61.2 g vinyl ester in example 24, making resin with a composition of VE/MLau 65/35. The resin was catalyzed with 0.35 g Cobalt naphthenate and 1.41 g Trigonox®. The resin was poured into a rectangular metal mold and allowed to cure at room temperature for 16 hrs. The resulting samples were hard and rigid. The samples were then postcured at 130° C. for 4 hours. DMA results indicated the sample had a modulus of 2.0 GPa at 35° C. and a $T_g$ of 79° C. Fracture toughness measurements resulted in an average $G_{IC}$ of 145 J/m$^2$. Flexural testing resulted in a modulus a 2.6 GPa and strength of 82 MPa.

Example 29

2.46 g of the methacrylated fatty acid monomer in example 16 was added to 4.57 g vinyl ester in example 24. The resin was initiated with 0.113 g Trigonox®. The resin was poured into a plastic mold and allowed to cure at 90° C. for 2 hrs. The resulting samples were hard and rigid. The samples were then postcured at 5° C./min to 180° C. DMA results indicated the sample had a modulus of 2.1 GPa at 35° C. and a $T_g$ of 94° C.

Example 30

2.716 g of the methacrylated fatty acid monomer in example 15 was added to 5.047 g vinyl ester in example 24. The resin was poured into a circular plastic mold and was electron beam irradiated for 2 minutes with a dosage of 3.5 MRad. The resin cured during this irradiation to form a stiff and hard polymer, but was then immediately postcured at 85° C. for 1 hr. DMA results indicated the sample had a modulus of 2.2 GPa and a $T_g$ of 105° C.

Example 31

10.82 g of the methacrylated fatty acid monomer in example 15 was added to 13.23 g vinyl ester in example 24. The resin viscosity was 792 cP as measured with a Brookfield viscometer.

Example 32

42.52 g of the methacrylated fatty acid monomer in example 15 was added to 51.97 g vinyl ester in example 24, making resin with a composition of VE/MLau 55/45. The resin was catalyzed with 0.35 g Cobalt naphthenate and 1.43 g Trigonox®. The resin was poured into a rectangular metal mold and allowed to cure at room temperature for 16 hrs. The resulting samples were hard and rigid. The samples were then postcured at 130° C. for 4 hours. DMA results indicated the sample had a modulus of 1.5 GPa at 35° C. and a $T_g$ of 71° C. Fracture toughness measurements resulted in an average $G_{IC}$ of 186 J/m². Flexural testing resulted in a modulus a 1.9 GPa and strength of 61.5 MPa.

Example 33

The VE/MLau resin from example 15 was placed in a 20 mL vial, with the lid screwed on tightly. The sample was allowed to sit for 2 years at room temperature in a dark cabinet. During this time, gelation did not occur.

Example 34

5 grams of methacrylated lauric fatty acid monomer (example 15) was added to 4 grams of methacrylated butyric fatty acid monomer (example 17) and 11 grams of vinyl ester resin in Example 24. The resin was catalyzed with 0.3 grams of Trigonox® and 0.075 grams of Cobalt naphthenate. The resin was poured into a plastic cylindrical mold and allowed to cure at room temperature for 16 hours. The resulting samples were hard and rigid. The samples were then postcured at 2° C./min to 180° C. DMA results indicated the sample had a modulus of 3.55 GPa and Tg of 77° C.

Example 35

33.36 g of the methacrylated fatty acid monomer in example 15 was added to 61.95 g acrylated vinyl ester in example 25, making resin with a composition of VE/MLau 55/45. The resin was catalyzed with 0.35 g Cobalt naphthenate and 1.44 g Trigonox®. The resin was poured into a rectangular metal mold and allowed to cure at room temperature for 16 hrs. The resulting samples were hard and rigid. The samples were then postcured at 130° C. for 4 hours. DMA results indicated the sample had a modulus of 1.56 GPa at 35° C. and a $T_g$ of 76.5° C. Fracture toughness measurements resulted in an average $G_{IC}$ of 105 J/m².

Example 36

10.54 g of the methacrylated oleic acid monomer in example 15 was added to 19.57 g vinyl ester in example 24. The resin viscosity was 2000 cP as measured with a Brookfield viscometer.

Example 37

85.7 g of the methacrylated fatty acid monomer in example 16 was added to 104.7 g acrylated vinyl ester in example 25, making resin with a composition of VE/MOA 55/45. The resin was catalyzed with 0.70 g Cobalt naphthenate and 2.8 g Trigonox®. The resin was poured into a rectangular metal mold and allowed to cure at room temperature for 16 hrs. The resulting samples were hard and rigid. The samples were then post-cured at 130° C. for 4 hours. DMA results indicated the sample had a modulus of 1.1 GPa at 35° C. and a $T_g$ of 75° C. Fracture toughness measurements resulted in an average $G_{IC}$ of 116 J/m².

Example 38

8.61 g vinyl ester from example 24 was blended with 3.31 g MOA from example 16 and 1.35 g styrene to make a resin with composition VE/MOA/Styrene 65/25/10. The resin viscosity was measured with a Brookfield viscometer and found to be 496 cP at 30° C.

Example 39

116.9 g vinyl ester from example 24 was blended with 45.0 g MOA from example 16 and 18.0 g styrene to make a resin with composition VE/MOA/Styrene 65/25/10. The resin was catalyzed with 0.68 g cobalt naphthenate and 2.7 g Trigonox®. The resin was poured into a metal rectangular mold and allowed to cure for 16 hrs at room temperature. The resulting polymer was hard and rigid and was clear and green in color. The surface finish of the sample was excellent. All surfaces were smooth and hard with no tackiness. The sample was post-cured at 130° C. for 4 hours. The $T_g$, as measured with DMA, was 118° C. The flexural modulus was 3.12 GPa and the flexural strength was 104 MPa. The fracture toughness was measured to be 147 J/m².

Example 40

2.625 g vinyl ester from example 24 was blended with 0.96 g MLau from example 15 and 1.19 g styrene to make a resin with composition VE/MLau/Styrene 55/20/25. The resin viscosity was measured to be 88 cP as measured with A TA Instruments AR2000 Rheometer.

EXAMPLE 41

51.66 g vinyl ester from example 24 was blended with 23.54 g MLau from example 15 and 18.8 g styrene to make a resin with composition VE/MLau/Styrene 55/25/20. The resin was catalyzed with 0.35 g cobalt naphthenate and 1.37 g Trigonox®. The resin was poured into a metal rectangular mold and allowed to cure for 16 hrs at room temperature. The resulting polymer was hard and rigid and was clear and green in color. The surface finish of the sample was excellent. All surfaces were smooth and hard with no tackiness. The sample was post-cured at 130° C. for 5 hours. The $T_g$, as measured with DMA, was 104° C. The flexural modulus was 3.02 GPa and the flexural strength was 106 MPa. The fracture toughness was measured to be 224 J/m$^2$.

Example 42

5.2 g vinyl ester was blended with 4.25 g acrylated oleic methyl ester. The resin formed a homogeneous solution. The resin viscosity was 1300 cP as measured with a Brookfield viscometer.

Example 43

1.31 g vinyl ester was mixed with 0.653 g acrylated oleic methyl ester. The reaction was catalyzed with 0.01 g cobalt naphthenate and 0.037 g Trigonox®. The resin was cured at room temperature and gelled within 1 hr, but was allowed to cure for 16 hrs. The resulting polymers formed a clear, yellow-green colored hard rigid solid. The resulting polymer had a $T_g$ of 67° C. and a modulus of 1.1 GPa.

Example 44

10.19 g vinyl ester from example 24 was blended with 5.49 g monomer from example 22. The resin formed a clear yellow-green homogeneous solution. The resin viscosity was 356 cP using a Brookfield Viscometer.

Example 45

1 g vinyl ester was mixed with 0.653 g acrylated oleic methyl ester. The reaction was catalyzed with 0.01 g cobalt naphthenate and 0.037 g Trigonox®. The resin was cured at room temperature and gelled within 1 hr, but was allowed to cure for 16 hrs. The resulting polymers formed a clear, yellow-green colored hard rigid solid. The resulting polymer had a $T_g$ of 67° C. and a modulus of 1.1 GPa.

Example 46

Oleic acid was reacted with an equimolar ratio of $Br_2$ to form 9-10 di-bromo stearic acid (Di-BrSA). In a simple procedure 20 g oleic acid (0.07 mole) was reacted with 11.32 g (0.07 mole) of bromine at room temperature. Bromine was added slowly in aliquots to prevent the excessive heating caused by the exothermic addition reaction. The red brown color of bromine instantly disappeared as bromine was added leading into a light orange colored solution. The solution was stirred at room temperature for an hour to ensure the completion of reaction. The $^1$H-NMR spectral analysis of this product indicated the disappearance of the 5.35 ppm peaks that represent the vinyl protons of oleic acid and the appearance of the 4.10-4.50 ppm peaks that represent the methylene protons attached to Br, confirming the complete reaction of the double bonds of oleic acid with $Br_2$. The viscosity of 9-10 di-bromo stearic acid was 463 cP at 25° C., considerably higher than that of oleic acid (24 cP).

Example 47

9-10 di-bromo stearyl glycidyl methacrylate (Di-BrSAGMA) was prepared by reacting 9-10 di-bromo stearic acid with an equimolar ratio of glycidyl methacrylate. 31.32 g (0.07 mole) Di-BrSA as prepared in Example 46 was reacted with 10.07 g (0.07 mole) glycidyl methacryate in the presence of 1 wt % AMC-2 as catalyst and 0.01 wt % hydroquinone. The reaction was run for 2.5 hours at 70° C. The IR spectrum of the product showed the disappearance of the 4530cm-1 epoxide peaks and also the replacement of the broad carboxylic acid band of oleic acid by the 3468 cm$^{-1}$ hydroxyl band. The $^1$H-NMR spectral analysis of this product indicated reaction of all the acid functionality with glycidyl methacrylate. The resulting monomer was a green colored liquid with a viscosity of 834 cP at 25° C.

VE(828)(65wt %)/ Di-BrSAGMA(35wt %) polymers cured at room temperature in presence of 1.5 wt % Trigonox® 239A, 0.0375 wt % Cobalt naphthanate, post-cured at 120° C. for 2 hours and at 160° C. for 2 hours, exhibited a storage modulus value of 0.53 GPa at 30° C. and a $T_g$ of 60° C. VE(828)(55 wt %)/ Di-BrSAGMA(20 wt %)/ Styrene(25 wt %) polymers cured at room temperature and postcured with a 5° C./min temperature ramp from room temperature to 200° C., exhibited a storage modulus value of 2.73 GPa at 30° C. and a $T_g$ of 104.3° C.

Examples 48-51

The viscosities of fatty acid-based vinyl resins containing 35 wt % and 45 wt % fatty acid monomer were measured at 30° C. Cobalt Napthenate (CoNap) and Trigonox® (45% cumene hydroperoxide) were used to cure the resins. 1.5 wt % Trigonox® and 0.375 wt % CoNap, based on the total resin mass, were used. The viscosities of the resins, before cure, ranged from 700-2500 cP. The viscosity of the resins increased with chain length and decreased as the level of unsaturation along the fatty acid backbone decreased. The level of unsaturation affected the viscosity because these sites caused kinks in the fatty acid chain and increased the intermolecular spacing.

Example 52

A resin was prepared by mixing 7.415 g of the vinyl ester resin prepared in example 15 with 4.471 g MOA prepared in example 16 and 2.963 g styrene. A sample from this resin was placed in a thermogravimetric analyzer. The mass loss resulting from styrene evaporation was measured as a function of time for 3 days at 40° C. The mass loss of amounted to only 20% of the initial sample mass, while the mass loss of high volatility commercial resins was 30-40% of the initial styrene mass.

Example 53

A resin was prepared by mixing 2148.8 g of a resin prepared in a manner similar to that in example 24 with 496.0 g the MLau prepared in example 15. Styrene in the amount of 662.1 g was added to the resin. 0.495 g hydroquinone was added in addition to 1.05 g cobalt naphthenate, followed by 7.4 g Trigonox®. A composite was prepared with 20 layers of 8 oz. E-glass universally sized woven mats using vacuum assisted resin transfer molding. The resin filled the part in less than 15 minutes. The sample was allowed to cure under vacuum all night. The finished part was hard and stiff, green in color and nearly clear.

Examples 54-55

Ternary blends of VE, FA monomer, and reactive diluents were also studied. In the ternary blends of fatty acid monomers, vinyl esters and reactive diluents, any conventional reactive diluents may be employed. Generally, any low viscosity monomer with a single, free-radically polymerizable group can be employed as a reactive diluent. Exemplary reactive diluents include, but are not limited to, styrene, ortho-methylstyrene, para-methylstyrene, 2-hydroxymethacrylate, methyl methacrylate, ethyl methacrylate, butyl methacrylate, methyl acrylate, cyclohexyl methacrylate, and isobornyl methacrylate.

The viscosity of VE/GM-FA/styrene was measured at 30° C. and was found to decrease exponentially with styrene content for resins containing 55 wt % and 65 wt % Epon 828™ resin Styrene contents of 8% or greater reduced the viscosity of VE resins to the acceptable range (<500 cP). Therefore, only low styrene contents are necessary, from a viscosity viewpoint. Thus, the amount of styrene in thermosetting resins can be greatly reduced by also using fatty acid monomers as reactive diluents.

The gelation behavior of these resins was similar to commercial thermosetting resins. The viscosity decreased slightly at low cure times because of external and internal (i.e. as a result of the reaction) heating. Then the viscosity increased drastically as gelation began to occur.

FTIR showed that the structure of the fatty acid monomer had a large effect on the cure kinetics. The cure rate of vinyl functional fatty acids (acrylated fatty acids and glycidyl methacrylate-fatty acid) decreased as the number of residual unsaturation sites on the fatty acid chain increased. For example, glycidyl methacrylate modified stearic acid cured faster and to a higher extent than glycidyl methacrylate modified linoleic acid. Therefore, the time for complete cure depends on the particular fatty acid used as well as the reaction temperature. For fatty acids with 0 or 1 residual unsaturation sites on the backbone, the time for complete cure is less than 1 hour at room temperature and less than 30 minutes at 90° C. The extents of reaction of the VE monomers are greater than 70%, which is greater than that of commercial resins. In addition, the extent of reaction of the fatty acid monomers is greater than 85%, which is slightly lower than the extent of reaction of styrene in many commercial VE and unsaturated polyester resins.

AOH-FA monomers do not cure to a large extent with VE. However, the VE monomer cures to greater than 80%, which is higher than the extent of cure of VE with styrene. Furthermore, the rate of cure is slow. Complete conversion required 3 weeks at room temperature.

Example 56

The properties of VE/FA polymer were measured using dynamic mechanical analysis (DMA) at 1 Hz. The polymer samples were cured at room temperature using CoNap and Trigonox® and post-cured with a 5° C. temperature ramp from room temperature to 200° C. The moduli ranged from 1-1.8 GPa and the glass transition temperature ($T_g$) ranged from 65-90° C. When the resins were cured at 90° C. and post-cured using a temperature ramp, the final properties improved. The moduli ranged from 1.5-2 GPa with $T_g$ ranging from 70-95° C. The range of properties was due to the use of a number of different fatty acids in these reactions. Both $T_g$ and the modulus increased as the fatty acid chain length decreased. This was expected because longer fatty acid chains increase the free volume of the polymer. The rubber moduli of the polymers were ~45 MPa, indicating the molecular weight between cross-links, $M_c$, was ~250 g/mol. According to rubber elasticity theory, $M_c$ should be 280 g/mol and 300 g/mol for 35% and 45% FA monomer, respectively, which is in good agreement with the results. This indicates that the conversion of monomer to polymer was high.

All of the various aspects of the invention may also employ a free-radical inhibitor, such as hydroquinone, to reduce or prevent gelation of the reaction mixture.

There are several advantages of one or more aspects of this invention. These advantages are:

The provision of novel fatty acid monomer products (Products 1b, 3a, 3b, 4a, 4b, 4c, 6b, 7b, 8a, and 8b).

The fatty acid monomers and their derivatives given above may be homopolymerized or copolymerized with another monomer to produce renewable or partly renewable polymers.

The fatty acid monomers and their derivatives given above may be used as replacements for styrene or other volatile reactive diluents to obtain low VOC systems for liquid molding, filament winding and wet lay-up applications, as well as in other composite manufacturing processes that require low viscosity resin systems.

Use of fatty acid monomers as reactive diluents in thermosetting resins in accordance with the present invention. Monomers for use in high $T_g$ systems were prepared that are compatible with common vinyl ester and polyester monomers.

Fatty acid monomers are one of the few types of monomers that are cost-competitive with reactive diluents, such as styrene. Furthermore, because fatty acids are derived from plant oils, their use promotes global sustainability.

The present invention provides means for affordably creating mono-functional fatty acids that will effectively toughen the resulting polymer.

The polymers created from ternary blends of VE, styrene, and FA monomers result in excellent surface finishes that may not require machining or surfacing cloth to produce high gloss finishes in resin based products. The mechanical properties of these materials may be comparable to styrene-based systems.

The polymers created using these fatty acid-based monomers may have better fracture toughness than comparable styrene-based resins.

The use of fatty acid monomers as reactive diluents has been tested experimentally and found to be successful, i.e. thermosetting liquid molding resins using fatty acid monomers to replace some or all of the styrene in these resins have been found to have acceptable resin viscosities and polymer mechanical properties similar to that of commercial vinyl ester/styrene polymers.

In general, compositions may include 1-99% by weight of vinyl ester monomers, 1-99% by weight of fatty acid monomers and 0-98% by weight of another reactive diluent, such as the reactive diluents mentioned above, with all weights being based on the weight of the polymer product. In binary compositions, the compositions will typically contain 50-70% by weight of vinyl ester monomers, and 30-50% by weight of any of the fatty acid monomers, with all weights being based on the weight of the polymer product.

Ternary compositions will typically include 50-70% by weight of vinyl ester monomers, 5-30% by weight of fatty acid monomers and 5-30% by weight of another reactive diluent, such as the reactive diluents mentioned above, with all weights being based on the weight of the polymer product.

These resins can be cured in any way used to cure free-radically reactive systems, including, but not limited to thermal cure, room temperature cure, electron beam cure, and ultraviolet cure.

Without being bound by theory, the present invention may be used to reduce VOC emissions by (1) lowering the VOC content of the resultant resin, (2) binding more of the reactive diluent into the resin to reduce the amount of reactive diluent that can volatilize, or (3) both (1) and (2).

The foregoing detailed description of the invention has been presented for the purpose of illustration and description only and is not to be construed as limiting the invention in any way. The skilled person will realize that many modifications and variations can be made within the scope of the present invention.

What is claimed is:

1. A fatty acid monomer of the formula 1b:

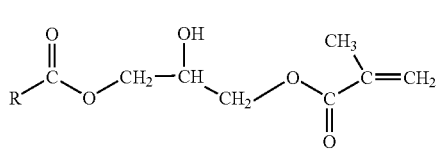

wherein the R—COO— group of the fatty acid monomer is derived from a fatty acid selected from the group consisting of linoleic acid, linolenic acid and a fatty acid mixture obtained from safflower oil.

2. A fatty acid monomer as claimed in claim 1, wherein the fatty acid monomer is derived from linoleic acid.

3. A fatty acid monomer as claimed in claim 1, wherein the fatty acid monomer is derived from linolenic acid.

4. A fatty acid monomer as claimed in claim 1, wherein the fatty acid monomer is derived from a fatty acid mixture obtained from safflower oil.

5. A fatty acid monomer of the formula 1b,

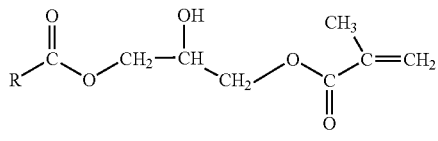

wherein R is selected from the group consisting of any $C_2$—$C_{30}$ acetylenic alkyl residue, hydroxy alkyl residue, carboxylic acid alkyl residue, divinyl ether alkyl residue, sulfur-containing alkyl residue, amide alkyl residue, methoxy alkyl residue, keto alkyl residue, halogenated alkyl residue, branched methoxy alkyl residue, branched hydroxyl alkyl residue, epoxy alkyl residue, fatty acyl-CoA alkyl residue, cyclopropane alkyl residue, cyclopentenyl alkyl residue, cyclohexyl alkyl residue, furanoid alkyl residue, phenylalkanoic alkyl residue, and lipoic alkyl residue.

6. A fatty acid monomer as claimed in claim 5, wherein R is selected from the group consisting of any $C_2$—$C_{30}$ hydroxy alkyl residue, carboxylic acid alkyl residue, divinyl ether alkyl residue, sulfur-containing alkyl residue and branched hydroxyl alkyl residue.

7. A fatty acid monomer of the formula 1b:

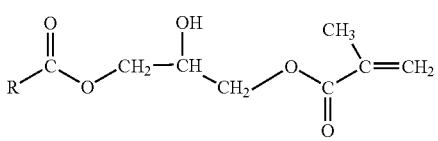

wherein wherein R is selected from the group consisting of a $C_{22}$—$C_{30}$ saturated alkyl residue, a $C_{22}$—$C_{30}$ unsaturated alkyl residue; and any $C_2$—$C_{30}$ acetylenic alkyl residue, hydroxy alkyl residue, carboxylic acid alkyl residue, divinyl ether alkyl residue, sulfur—containing alkyl residue, amide alkyl residue methoxy alkyl residue, keto alkyl residue, halogenated alkyl residue, branched methoxy alkyl residue, branched hydroxyl alkyl residue, epoxy alkyl residue, fatty acyl-CoA alkyl residue, cyclopropane alkyl residue, cyclopentenyl alkyl residue, cyclohexyl alkyl residue, furanoid alkyl residue, phenylalkanoic alkyl residue, and lipoic alkyl residue and the fatty acid monomer is a hydrocarbon of up to 26 atoms in length.

8. A fatty acid monomer of the formula:

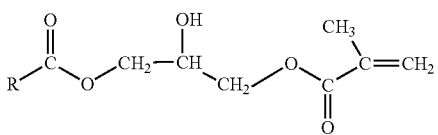

wherein R' is $CH_3CH_2CH_2$—.

* * * * *

UNITED STATES PATENT AND TRADEMARK OFFICE
CERTIFICATE OF CORRECTION

| | | |
|---|---|---|
| PATENT NO. | : 7,524,909 B2 | Page 1 of 1 |
| APPLICATION NO. | : 11/124551 | |
| DATED | : April 28, 2009 | |
| INVENTOR(S) | : Giuseppe Raffaello Palmese, John Joseph La Scala and James Matthew Sands | |

It is certified that error appears in the above-identified patent and that said Letters Patent is hereby corrected as shown below:

Column 1, line 12, please insert the following text:

-- Statement of Government Interest
  This invention was reduced to practice with Government support under Grant No. DAAD19-02-2-0010 awarded by the Army Research Laboratory; the Government is therefore entitled to certain rights to this invention. --

Signed and Sealed this

Fourteenth Day of July, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,524,909 B2
APPLICATION NO. : 11/124551
DATED : April 28, 2009
INVENTOR(S) : Giuseppe Raffaello Palmese, John Joseph La Scala and James Matthew Sands It is certified that error appears in the above-identified patent and that said Letters Patent is hereby corrected as shown below:

Column 1, line 13, please replace "1." with "2."

Column 1, line 18, please replace "2." with "3."

Signed and Sealed this
Twenty-eighth Day of August, 2012

David J. Kappos
*Director of the United States Patent and Trademark Office*